United States Patent Office 3,271,408
Patented Sept. 6, 1966

3,271,408
β-CYANOVINYL THIOETHERS OF CERTAIN THIAZOLE COMPOUNDS
Everett Joseph Frazza, Yorktown Heights, N.Y., and Lorence Rapoport, Stamford, Conn., assignors to American Cyanamid Company, Stamford, Conn., a corporation of Connecticut
No Drawing. Original application July 19, 1960, Ser. No. 43,723. Divided and this application Apr. 27, 1964, Ser. No. 368,437
3 Claims. (Cl. 260—306.6)

This application is a division of application Serial No. 43,723, filed July 19, 1960, said latter application being a continuation-in-part of application Serial No. 704,883, filed December 24, 1957. The latter two applications are now abandoned.

This invention relates to a process for preparing β-cyanovinyl thioethers and to certain novel β-cyanovinyl thioethers.

Thus, it relates to certain β-cyanovinyl thioethers which may be represented by the formula:

(I)   NCCH=CHSR in which R is a heterocyclic radical selected from the group consisting of thiazolinyl, thiazolyl, benzothiazolinyl, and benzothiazolyl.

In another aspect, it relates to a novel process for the preparation of β-cyanovinyl thioethers which may be represented by the formula:

(II)   NCCH=CHSR in which R in addition to being a heterocyclic radical may also be an aliphatic or an aromatic radical.

It has now been discovered that β-cyanovinyl thioethers as represented by a Formula II above may be simply and readily prepared in accordance with the process of this invention by the cyanovinylation of mercaptans. In a more particular aspect, these β-cyanovinyl ethers are obtained by reacting β-chloroacrylonitrile with a mercaptan in an inert reaction medium in the presence of a hydrogen chloride acceptor. On completion of the reaction, which is conducted at below about 100° F., the precipitate is separated by conventional means and the β-cyanovinyl thioether recovered from the residual liquor as by distillation or crystallization.

It is a feature of this invention that substantially any mercaptan can be readily reacted with β-chloroacrylonitrile to obtain a β-cyanovinyl thioether, i.e. one in which R in the Formula II hereinabove is an aliphatic aromatic, or heterocyclic radical, in good yield. As illustrative of the mercaptans which may be employed, according to the process of this invention, there may be mentioned alkyl mercaptans such as the methyl, ethyl, n-propyl, isopropyl, n-butyl, isobutyl, t-butyl, n-hexyl, n-dodecyl, t-dodecyl and n-octadecyl mercaptans and the like; allyl mercaptan; substituted aliphatic mercaptans, for instance, mercaptoalcohols such as mercaptoethanol and the like; thioacids such as thioacetic acid, thiopropionic acid, thiobutyric acid, thioglycollic acid and the like; dimercaptans such as dimercaptoethane, dimercaptopropane and the like; aryl mercaptans, for instance, thiophenol, thionaphthol, thiocresol, thioxylenol, thionaphthol and the like; thioacids such as thiobenzoic acid; hydroxy mercaptans such as thiocatechol, thiohydroquinone, thioresorcinol and the like; aromatic dithiols such as dithioresorcinol, dithiocatechol, dithiohydroquinone, dimercaptonaphthalene; and heterocyclic mercaptans such as mercaptothiazolines, mercaptothiazoles, mercaptothiophenes, mercaptofurans, mercaptopyrroles, mercaptopyridines and mercaptoquinolines.

The particular reaction medium employed in the process of this invention is restricted only in that it be inert to the reactants and is preferably a solvent therefor. Any of the conventional materials, including water, which are generally employed in this capacity are suitable. Alcohols such as methanol; chlorinated aliphatic hydrocarbons such as carbon tetrachloride and trichlorethylene; benzene and its homologues and their halogenated derivatives; amides such as dimethylformamide; esters such as ethyl acetate; and the like may all be used. During the reaction, it is also preferable to have present an acceptor to fix the hydrogen chloride. Illustrative of the various materials which may be employed for this purpose are inorganic bases such as sodium carbonate and bicarbonate; tertiary amines such as triethylamine, N-ethylmorpholine, dimethylbenzylamine, tributylamine, pyridine, N-methylpyridine and the like.

β-Cyanovinyl thioethers as represented in Formula II hereinabove may also be readily prepared by reacting β-chloroacrylonitrile with a salt of mercaptan such as an alkali metal salt preferably sodium or potassium. When prepared in this manner, the alkali metal combines with the chlorine and the addition of a tertiary amine as an HCl acceptor is unnecessary.

The compounds prepared in accordance with the processes of this invention have various uses. Among these may be mentioned their use in the field of agriculture wherein herbicidal, fungicidal, nematocidal and insecticidal properties have been demonstrated. As chemical intermediates they may be employed in the preparation of sulfones which have also demonstrated utility in the field of agriculture. The unsaturation of these compounds, moreover, renders them useful in the preparation of a variety of copolymers for use in recognized fields.

The following examples will illustrate the process of the invention. All parts are by weight unless otherwise indicated.

*Example 1.—Methyl β-cyanovinyl thioether*

A solution of 29.2 parts of β-chloroacrylonitrile, 33.8 parts of triethylamine and 130 parts of benzene is cooled to 0° C. and 16.1 parts of methyl mercaptan bubbled in over a period of 75 minutes. The temperature is held below 10° C. during the addition and for an additional hour, after which the solution is allowed to stand overnight at room temperature. The precipitate is filtered off and the filtrate distilled giving 27 parts (84%) of product boiling at 92–93°/10 mm.; $n_D^{25}$ 1.5371. Calc'd for $C_4H_5NS$: C, 48.45; H, 5.08; N, 14.13. Found: C, 48.67; H, 5.25; N, 13.89. The infrared spectrum of this compound exhibits a strong CN band at 2225 cm.$^{-1}$ and a strong C=C band at 1570 cm.$^{-1}$. These two bands are characteristic of the β-cyanovinyl thioethers of this invention.

*Example 2.—Ethyl-β-cyanovinyl thioether*

NCCH=CHSCH$_2$CH$_3$

The procedure of Example 1 is repeated replacing methyl mercaptan with an equivalent amount of ethyl mercaptan to give ethyl-β-cyanovinyl thioether.

*Example 3.—t-Butyl-β-cyanovinyl thioether*

CNCH=CHSC(CH$_3$)$_3$

The procedure of Example 1 is again repeated except that a chemically equivalent amount of t-butyl mercaptan is substituted for the methyl mercaptan. After addition is complete, the solution is allowed to stand overnight. After separation of the precipitate, t-butyl-β-cyanovinyl thioether is recovered by distillation. Strong infrared CN and C=C bands at 2225 cm.$^{-1}$ and 1570 cm.$^{-1}$, respectively, are exhibited as in the spectrums of the compounds of Examples 1 and 2.

Example 4.—Sec-butyl-β-cyanovinyl thioether

The procedure of Example 3 is repeated substituting an equivalent amount of sec-butyl mercaptan for t-butyl mercaptan to obtain sec-butyl-β-cyanovinyl thioether.

Example 5.—n-Dodecyl-β-cyanovinyl thioether

To a solution of 40.4 parts of n-dodecyl mercaptan, 20.2 parts of triethylamine and 120 parts of benzene, there is added 17.5 parts of β-chloroacrylonitrile at 25–29°. After removal of the by-product amine salt by filtration, the filtrate is washed with water and saturated sodium chloride solution and then dried over anhydrous sodium sulfate. Most of the solvent is removed by distillation at reduced pressure and the residue cooled in ice. Filtration gives 33.5 parts (72.5%) of n-dodecyl β-cyanovinyl thioether as a pale yellow, low melting waxy solid which is soluble in most of he common organic solvents. The infrared spectrum of this material exhibits the usual strong CN and C=C bands at 2225 cm.$^{-1}$ and 1570 cm.$^{-1}$, respectively.

Example 6.—2-benzothiazolyl-β-cyanovinyl thioether

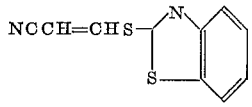

To a solution of 33.4 parts of mercaptobenzothiazole and 20.2 parts of triethylamine in 120 parts of acetone is added 17.5 parts of β-chloroacrylonitrile at 25–30° C. Filtration, evaporation of the filtrate, and recrystallization of the residue from methylene chloride gave 36 parts (82%) of 2-benzothiazolyl-β-cyanovinyl thioether which melted at 105–107° C. Cal'cd. for $C_{12}H_6S_2N_2$: C, 55.05; H, 2.77; N, 12.83. Found: C, 54.93; H, 2.93; N, 13.07.

Example 7.—2-thiazolinyl-β-cyanovinyl thioether

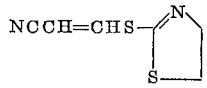

The procedure of Example 6 is repeated except an equivalent amount of mercaptothiazoline is substituted for the mercaptobenzothiazole to give 2-thiazolinyl-β-cyanovinyl thioether.

Example 8.—p-Tolyl-β-cyanovinyl thioether

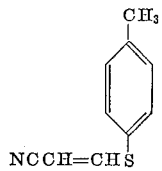

To a stirred solution of 8.75 parts of β-chloroacrylonitrile, 10.1 parts of triethylamine and 225 parts of ether is added 12.4 parts of p-thiocresol, with ice bath cooling to hold the temperature below 30° C. After standing overnight the precipitate is filtered off and the filtrate distilled to give 11.6 parts of p-tolyl-β-cyanovinyl thioether as a low melting solid (35–40° C.) boiling at 116–120°/0.2 mm. Cal'cd. for $C_{10}H_9NS$: C, 68.54%; H, 5.18%; N, 7.99%. Found: C, 68.40%; H, 5.07%; H, 7.71%.

Example 9.—o- and m-Tolyl-β-cyanovinyl thioether

The corresponding β-cyanovinyl thioethers are obtained in the procedure of Example 8 by replacing p-thiocresol with o- and m-thiocresol, respectively.

Example 10.—Phenyl-β-cyanovinyl thioether

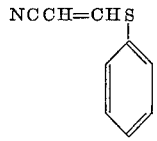

The procedure of Example 8 is repeated substituting an equivalent amount of thiophenol for the p-thiocresol to give phenyl-β-cyanovinyl thioether.

Example 11.—Naphthyl-β-cyanovinyl thioether

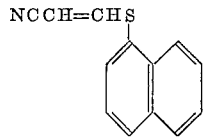

The procedure of Example 8 is again repeated substituting an equivalent amount of thionaphthol for the p-thiocresol to give naphthyl-β-cyanovinyl thioether.

The following examples illustrate the use of the compounds of this invention in the field of agriculture.

Example 12

An aqueous dispersion of the compound of Example 1 gives 100% kill of Anguilla nematodes at a concentration of 0.1%. Radish seeds, representing dicotyledonous plants, when treated with an aqueous dispersion of the compound of Example 1 show a high mortality at a concentration of 0.1%.

Example 13

An aqueous solution of the compound of Example 8 gives 100% kill of the nasturtium aphid at a concentration of 0.1%.

Example 14

Wheat seeds, representing monocotyledonous plants, when treated with an aqueous dispersion of the compound of Example 6 show a mortality of 90% at a concentration of 0.1%.

At a concentration of 0.01% an aqueous dispersion of the compound of Example 6 also gives a 100% kill of *Sclerotinia fructicola* and *Macrosporium sarcinaeforme*.

Obviously the compounds of the present invention manifest varying degrees of herbicidal, fungicidal, nematocidal and insecticidal activity and the foregoing illustrations are merely typical.

We claim:
1. A compound of the formula:

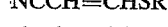

in which R is a radical selected from the group consisting of thiazolinyl, thiazolyl, and benzothiazolyl.
2. 2-thiazolinyl-β-cyanovinyl thioether.
3. 2-benzothioazolyl-β-cyanovinyl thioether.

No references cited.

ALEX MAZEL, *Primary Examiner.*

HENRY R. JILES, NICHOLAS S. RIZZO, *Examiners.*

ALTON D. ROLLINS, *Assistant Examiner.*